United States Patent [19]

Kinzel

[11] 4,091,510
[45] May 30, 1978

[54] LOCKING ARRANGEMENT FOR JEWELRY AND THE LIKE

[76] Inventor: Augustus B. Kinzel, 1738 Castellana Rd., La Jolla, Calif. 92037

[21] Appl. No.: 789,403

[22] Filed: Apr. 21, 1977

[51] Int. Cl.² .......................................... B44B 19/00
[52] U.S. Cl. ................................................ 24/230 R
[58] Field of Search .................. 24/230 R, 233, 234, 24/165, 265, 266, 265 WB, 201

[56] References Cited

U.S. PATENT DOCUMENTS

| | | | |
|---|---|---|---|
| 589,880 | 9/1897 | Walsh | 24/230 R |
| 1,242,159 | 10/1917 | Dunkleberger | 24/230 R |
| 1,284,455 | 11/1918 | Reinsdorf | 24/230 R |
| 1,920,408 | 8/1933 | Lafayette | 24/230 R |
| 2,552,728 | 5/1951 | Liner | 24/201 |
| 2,784,478 | 3/1957 | Schmitt | 24/233 X |

FOREIGN PATENT DOCUMENTS

| | | | |
|---|---|---|---|
| 641,902 | 10/1928 | France | 24/230 R |
| 1,101,905 | 10/1955 | France | 24/230 R |

*Primary Examiner*—Bernard A. Gelak
*Attorney, Agent, or Firm*—Connolly and Hutz

[57] ABSTRACT

A locking arrangement for releasably securing two objects together such as the ends of a jewelry chain includes a set of activating members secured to one of the objects and resiliently urged in a normal position with a set of locking members being connected by transmitting means for being selectively disposed in either a closed position or open position in accordance with whether or not a force is applied against the resilient means so that the locking members may be removably attached to the other object or end of a chain when in the open position and then remain secured thereto when returned to the closed position.

9 Claims, 4 Drawing Figures

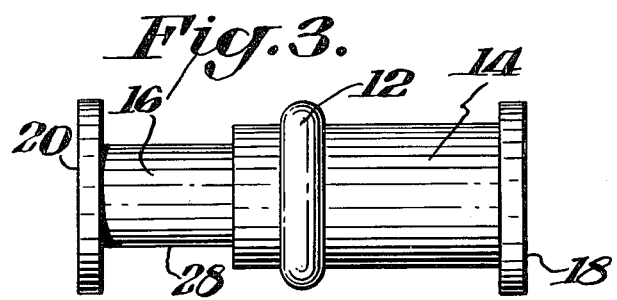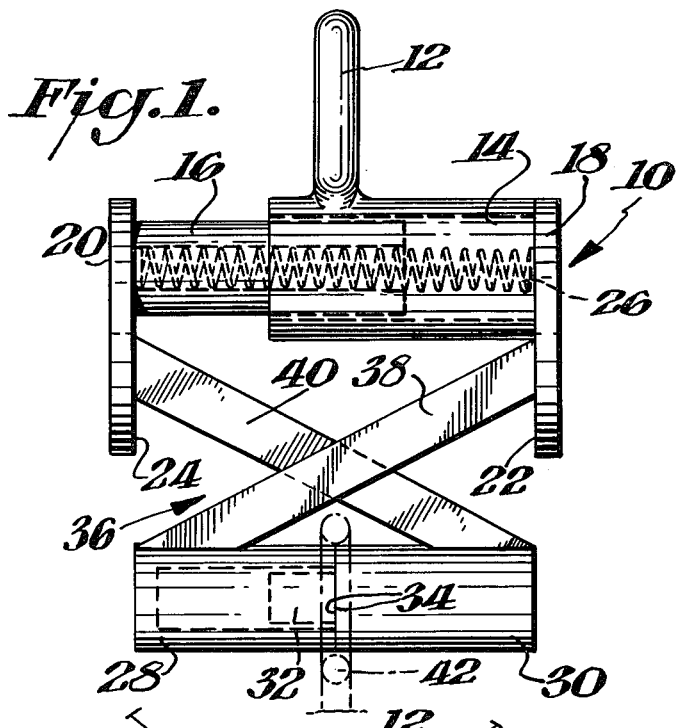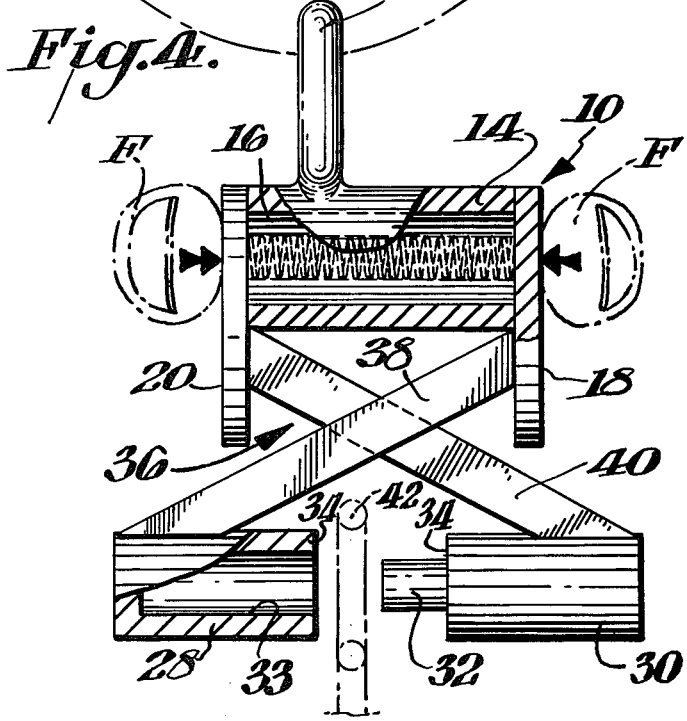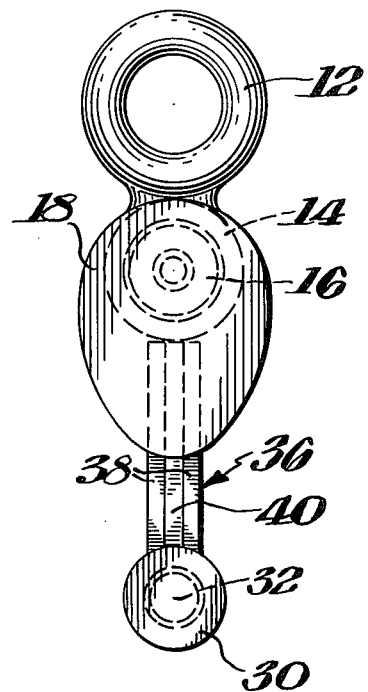

LOCKING ARRANGEMENT FOR JEWELRY AND THE LIKE

BACKGROUND OF THE INVENTION

The present invention has particular utility as a jewelry clasp such as for securing together two ends of a chain, string or linear sections forming a continuous loop when closed. Conventionally, such devices must be opened and closed to be put on and worn. The most common locking arrangement in such devices includes providing an open loop at one end which is fitted with a solid torus while the other end includes a clasp comprising a locking torus or ring with an opening in the ring. This locking torus is generally constructed of tubular shape and has a spring pushing on a circumferentially sliding plug with a lug thereon. The locking torus has a circumferential slit in which the lug moves. The opening in this locking torus is kept closed by the spring pushing on the sliding plug and is opened by putting the fingernail on the lug and pushing back the spring thus allowing the opening in that torus to be slid over the other torus on the other end of the chain. Such operation is cumbersome particularly when it must be done on very small units. Moreover, the manipulations required must be done out of the line of sight of the user and in many cases require high digital dexterity.

SUMMARY OF THE INVENTION

An object of this invention is to provide a locking arrangement which dispenses with the need for the conventional sliding lug in a torus.

A further object of this invention is to provide such a locking arrangement which is particularly adopted to function as a jewelry clasp for securing together the ends of chains or the like.

A still further object of the invention is to provide a locking arrangement which is simple to operate and which does not require a complicated hinging arrangement.

In accordance with this invention the locking arrangement includes a set of activating members secured to one of the objects such as a chain end and which is resiliently urged in a normal position. A set of locking members is also provided for selectively being disposed in either a closed position or an open position whereby in the open position the other object such as the opposite end of a chain may be secured thereon and then locked in place when the locking members are in the closed position. Transmitting means connect the actuating members to the locking members for determining the position of the locking members in accordance with the position of the actuating member.

In the preferred form of this invention the transmitting means comprises at least one bar disposed between a pair of parallel bars to form an X therewith with the bars moving by relative sliding motion rather than a complicated hinged arrangement.

THE DRAWINGS

FIG. 1 is a side view in elevation of a locking arrangement in accordance with this invention;

FIG. 2 is a front elevation view of the arrangement shown in FIG. 1;

FIG. 3 is a top plan view of the arrangement shown in FIGS. 1-2; and

FIG. 4 is a side elevation view similar to FIG. 1 but partly in section and showing the arrangement in a different phase of operation.

DETAILED DESCRIPTION

The invention is designed to releasably secure together two objects and has particular utility as a jewelry clasp for securing together ends of chains, strings or essentially linear sections or the like which must be opened and closed to be put on and worn. The present invention utilizes a set of actuating members or an actuating unit which is, for example, secured to one end of a chain and which is squeezed to provide an opening with respect to a set of locking members for the solid torus at the other end of the chain. The principle of the invention involves reversing the direction in a sliding motion in an otherwise rigid structure, whose rigidity is not compromised by bearings or other motion of any part.

In the illustrated embodiment the locking arrangement 10 is intended to secure together two ends of a chain. As best shown in FIG. 1, one end of the chain would be permanently connected to, for example, ring 12 rigidly connected to cylinder 14. Cylinder 14 is hollow and comprises one member of the set of actuating members with member 14 telescopically receiving the other member, hollow cylinder 16. The remote ends of cylinders 14, 16 are closed by outer walls 18, 20 having flanges 22, 24 extend therefrom. The walls and flanges are formed as discs for gripping purposes, as later described, and to facilitate ease of handling. An axial coil spring 26 is disposed within the telescoping cylinders to urge them apart as far as the rest of the construction permits, which is to be considered as the normal position of the actuating members.

Locking arrangement 10 further comprises a set of locking members which includes a closed end hollow tube 28 having an axial bore 33 and a solid cylinder 30 having an axial extension thereon in the form of a pin or a rod 32 of a diameter to fit within the bore 33 of hollow tube 28. Tube 28 and cylinder 30 are of equal diameter and equal length excluding the extended length and reduced diameter section of rod 32. FIG. 1 shows the locking members in their normally closed condition. In this condition the locking members are of a combined length the same as the combined telescopic length of actuating members 14, 16 when in their normal condition.

Transmitting means 36 is provided for transmitting the sliding motion of actuating members 14, 16 to locking member 28, 30. The specific structure of transmitting means 36 is especially advantageous since it departs from the complicated hinged type arrangement and instead utilizes a sliding action. As indicated in the drawings transmitting means in the illustrated embodiment includes a pair of spaced parallel bars 38 fixedly secured at one end to tube 28 and at the other end to the disc-like extension or flange 22 of outer cylinder 14. Between the parallel bars 38 is slidably arranged a single bar 40 which likewise is rigidly secured at one end to cylinder 30 and at the other end to disc-like extension 24 of cylinder 16. Any number of bars or cross pieces 38, 40 may be utilized in any grouping as long as at least two such bars are provided to guide an intermediate bar. As illustrated bars 38, 40 are preferably made flat with a rectangular cross section. As shown in FIGS. 1 and 4 the bars 38, 40 cross to generally form an X. Because bar 40 is disposed between the pair of bars 38 the relative positioning of the members is assured and thus bar 40 is maintained in the proper sliding relationship with bars 38.

FIG. 1 shows the various components of locking arrangement 10 in their normal condition with locking elements 28, 30 being in their closed condition. As previously indicated one end of, for example, a chain is permanently secured to ring 12. When it is desired to attach or to remove the opposite end of the chain from the locking arrangement the discs secured at the outer ends of cylinders 14, 16 are simply squeezed together compressing spring 26. By virtue of the transmitting means 36 the linear motion of actuating members 14, 16 is transmitted to locking members 28, 30 causing the locking members to move linearly away from each other with rod 32 being completely withdrawn from bore 33 of tube 28 and an open space being created therebetween. The loop or solid torus 42 at the opposite end of the chain could then be inserted in this open space with the opening of the loop being generally axially alinged with rod 32 as shown in FIG. 4. By cessation of the squeezing force of the fingers F spring 26 causes cylinders 14, 16 to return to their normal position which in turn, by way of transmitting means 36, causes locking members 28, 30 to likewise return to their closed position with faces 34 abutting each other thereby locking or confining loop 42 around the locking elements.

If desired to assure the proper positioning of loop 42 with respect to locking elements 28, 30, the loop may be inserted in the open space between the locking elements as illustrated in FIG. 4 and then slid over, for example, tube 28 until it contacts bar 38 to assure that the loop itself remains out of contact with rod 32 or abutting faces 34 during the closing action of the locking elements.

As can be appreciated the invention thereby provides an effective yet convenient manner of securing two objects together in a way requiring only a simple squeezing pressure from two fingers thereby causing the locking elements to move linearly without the necessity for the employment of any complicated hinging mechanism.

What is claimed is:

1. A locking arrangement for releasably securing two objects together such as for functioning as a jewelry clasp or the like comprising a set of actuating members movable toward and away from each other in a linear path, resilient means reacting between said actuating members urging said actuating members away from each other, securing means connected to said set of actuating members for securement to one of the objects, a set of locking members spaced from and parallel to said actuating members, said locking members being movable toward and away from each other in a linear path parallel to said linear path of said actuating members, said locking members being movable away from each other to an open position with said locking members spaced apart from each other to permit the other of the two objects to pass therebetween, said locking members being movable toward each other to a closed position to prevent the other of the two objects from passing between said locking members, a set of cross pieces connecting said actuating members to said locking members, each of said cross pieces being connected at one end to one end of one of said actuating members and at its other end to the diametrically opposite end of the remote member of said locking members and at least two of said cross pieces intersecting each other with each end of each of said actuating members and of said locking members being connected to said cross pieces whereby movement of said actuating members toward each other causes said locking members to move away from each other and movement of said actuating members away from each other causes said locking members to move toward each other.

2. The locking arrangement of claim 1 including guide means for maintaining said cross pieces in proper position with respect to each other during their relative movement as said actuating members and said locking members are moving.

3. The locking arrangement of claim 2 wherein said set of cross pieces includes a pair of parallel bars with a further bar slidably non-hingedly arranged therebetween, and said pair of parallel bars comprising said guide means.

4. The locking arrangement of claim 1 wherein said actuating members comprise a first and second hollow cylinder open at each end disposed toward each other, said first hollow cylinder having an inner diameter at least as great as the outer diameter of said second hollow cylinder for telescopically receiving said second hollow cylinder therein, said hollow cylinders being closed at their remote ends, and said resilient means being a spring disposed in said hollow cylinder and reacting against said remote ends.

5. A locking arrangement of claim 4 wherein said locking members include a locking cylinder and a hollow tube in the path of motion of said locking cylinder, said hollow tube being open at its end facing said locking cylinder, and said locking cylinder having an extension for telescopically sliding into and out of said hollow tube during the closed position and open position respectively of said locking members.

6. The locking arrangement of claim 4 wherein said locking cylinder is a solid cylinder and said extension being a rod axially arranged on said locking cylinder, and said locking cylinder and said hollow tube having contact faces disposed toward each other for contacting each other when said locking members are in said closed position.

7. The locking arrangement of claim 6 wherein said hollow cylinders are coaxial and are each provided at their said closed ends with a disc-like extension to provide a gripping surface for the user and to facilitate the ease of handling of said locking arrangement, and said transmitting means being secured to said disc-like extensions.

8. The locking arrangement of claim 1 wherein said securing means comprises a ring secured to said set of actuating member for securement to an article of jewelry.

9. The locking arrangement of claim 8, in combination therewith, a chain having a loop at one end, the other end of said chain being secured to said ring, and said loop being dimensioned to permit said locking members to pass through its open space whereby said loop may be detachably secured to said locking members.

* * * * *

UNITED STATES PATENT AND TRADEMARK OFFICE
CERTIFICATE OF CORRECTION

PATENT NO. : 4,091,510
DATED : May 30, 1978
INVENTOR(S) : Augustus B. Kinzel

It is certified that error appears in the above-identified patent and that said Letters Patent are hereby corrected as shown below:

Claim 6, line 1, change "4" to -- 5 --.

Signed and Sealed this

Nineteenth Day of December 1978

[SEAL]

Attest:

RUTH C. MASON
Attesting Officer

DONALD W. BANNER
Commissioner of Patents and Trademarks